(12) United States Patent
Ludas et al.

(10) Patent No.: US 9,217,500 B2
(45) Date of Patent: Dec. 22, 2015

(54) DRIVE TRAIN

(71) Applicant: Voith Patent GmbH, Heidenheim (DE)

(72) Inventors: Bernhard Ludas, Aalen (DE); Manuel Rathgeb, Wallerstein (DE)

(73) Assignee: Voith Patent GmbH, Heidenheim (DE)

( * ) Notice: Subject to any disclaimer, the term of this patent is extended or adjusted under 35 U.S.C. 154(b) by 5 days.

(21) Appl. No.: 14/112,489

(22) PCT Filed: Apr. 12, 2013

(86) PCT No.: PCT/EP2013/057701
§ 371 (c)(1),
(2) Date: Oct. 17, 2013

(87) PCT Pub. No.: WO2013/182337
PCT Pub. Date: Dec. 12, 2013

(65) Prior Publication Data
US 2014/0309067 A1    Oct. 16, 2014

(30) Foreign Application Priority Data

Jun. 4, 2012   (DE) .......................... 10 2012 010 914

(51) Int. Cl.
*F16H 47/08*   (2006.01)
*F03D 11/02*   (2006.01)
(Continued)

(52) U.S. Cl.
CPC .............. *F16H 47/085* (2013.01); *F03B 11/06* (2013.01); *F03B 13/00* (2013.01); *F03D 11/02* (2013.01);
(Continued)

(58) Field of Classification Search
CPC ....... F03D 11/02; F16H 47/00; F16H 47/085; F05B 2260/40311; Y02E 10/722

USPC ...................................................... 475/35, 42
See application file for complete search history.

(56) References Cited

U.S. PATENT DOCUMENTS 2,951,398 A * 9/1960 Glomb et al. ................... 475/48
3,075,410 A * 1/1963 Weinrich et al. ............... 475/51
(Continued)

FOREIGN PATENT DOCUMENTS

CN     201496213     6/2002
DE     103 14 757    11/2004
(Continued)

OTHER PUBLICATIONS

English Translation of PCT International Preliminary Report on Patentability dated Dec. 18, 2014 in PCT Application No. PCT/EP2013/057701.

*Primary Examiner* — Sherry Estremsky
(74) *Attorney, Agent, or Firm* — Farjami & Farjami LLP

(57) ABSTRACT

There is provided a drive train for transmitting a variable power with a variable input speed at a drive shaft and a substantially constant output speed at an output shaft for a power generation installation, driven by a continuous-flow machine. The drive train includes a power-split transmission having a first planetary gear as a superposition gear and a second planetary gear, and a hydrodynamic component which takes up power from an output side and returns said power in a controlled manner to the power-split transmission. The first and second planetary gears are coupled to each other via a common planet carrier. The drive shaft is coupled to a ring gear of the first planetary gear, and wherein in the common planet carrier, planets of the first planetary gear and planets of the second planetary gear are accommodated in an alternating fashion in a circumferential direction.

16 Claims, 2 Drawing Sheets

(51) Int. Cl.
*F03B 11/06* (2006.01)
*F03B 13/00* (2006.01)

(52) U.S. Cl.
CPC ............ *F16H 47/08* (2013.01); *F05B 2240/53* (2013.01); *F05B 2260/40311* (2013.01); *Y02E 10/226* (2013.01); *Y02E 10/722* (2013.01)

(56) References Cited

U.S. PATENT DOCUMENTS

| | | | | |
|---|---|---|---|---|
| 3,078,739 | A * | 2/1963 | Weinrich | 74/720 |
| 3,180,180 | A * | 4/1965 | Helfer et al. | 475/36 |
| 3,435,707 | A * | 4/1969 | De Julian | 475/36 |
| 7,914,411 | B2 * | 3/2011 | Basteck | 475/35 |
| 2012/0104754 | A1 * | 5/2012 | Rudolf et al. | 290/44 |
| 2012/0302395 | A1 * | 11/2012 | Poon | 475/331 |

FOREIGN PATENT DOCUMENTS

| | | |
|---|---|---|
| DE | 10 2008 011 386 | 3/2009 |
| EP | 1 895 157 | 3/2008 |
| GB | 1015596 | 1/1966 |

\* cited by examiner

DRIVE TRAIN

FIELD OF THE INVENTION

The invention relates to a drive train for transmitting a variable power with variable input speed and a substantially constant output speed in the manner as defined in more detail in the present application.

BACKGROUND

A generic drive train is known from DE 103 14 757 B3. In the drive train described in this specification, a power-split transmission is known in combination with a hydrodynamic component for the controlled return of power to the power-split transmission. This drive train is predominantly used in the area of wind power, but it is also suitable to use with hydraulic turbines which supply different input speeds to an input shaft of the drive train. The input shaft is connected in the drive train mentioned in the specification to the planet carrier of a first planetary gear. A first and a second planetary gear, which form the power-split transmission, are connected to each other via their ring gears. The sun gear is connected to the power take-off and simultaneously to a driven part of the hydrodynamic component, e.g. the impeller, in the formation of the hydrodynamic component as a converter. The sun gear of the second planetary gear is coupled via the turbine wheel in the embodiment of the hydrodynamic component as a converter, whose planet carrier is tightly held.

The disadvantage in all these configurations is that they are typically very large and very heavy. This leads to large mass moments of inertia, which have a negative effect on the dynamics and cause high costs. Lastly, they also limit the power of such a drive train.

It is now the object of the present invention to provide a drive train which avoids these disadvantages, enables a simple and efficient configuration and which ensures a respectively high power.

This object is achieved in accordance with the invention by a drive train with the features in the present application. Advantageous embodiments and further developments are provided in the present application.

It is provided in the drive train in accordance with the invention that the power-split transmission, as also in the prior art, is formed by two planetary gears which are arranged as a superposition gear and reversing gear. The coupling of the planetary gears among each other occurs in accordance with the invention by a common planet carrier. The two planets carriers that were provided until now are therefore combined with each other and are reconverted into a single planet carrier. This allows realizing the transmission in a lighter, more compact way with lower mass moments of inertia.

It is provided in an especially advantageous further development of the drive train in accordance with the invention that the drive shaft is coupled to the ring gear of the first planetary gear. Such a coupling of the drive shaft via the ring gear to the first planetary gear allows a very high transmissible power, so that a construction designed in this fashion is not limited in its power, as is the case with the specific configuration as described in the state of the art with a drive of the planet carrier. This allows covering a larger power range with the drive train in accordance with the invention in the configuration as described herein.

SUMMARY

The planets in the common planet carrier can be disposed on different diameters in the event of very large differences in the size of the planetary gears, so that they will not obstruct each other in the common planet carrier. In most applications however the two planetary gears will be arranged in such a similar way with respect to their size that receiving the planets in the radial direction would be impaired. In a very advantageous further development of the drive train in accordance with the invention it is therefore provided that the planets of the first planetary gear and the second planetary gear are accommodated in an alternating fashion in the circumferential direction in the common planet carrier. The planets, which can principally be arranged as pin planets or ring planets, are accommodated in this especially advantageous embodiment in an alternating manner with respect to each other in the circumferential direction of the planet carrier. The planet carrier can be arranged at least with a part between the two planetary gears. In this part, the bearings are accommodated in the case of pin planets, or the axes are accommodated in the case of ring planets. In order to reduce overall space, the receivers for the planets of the one planetary gear are arranged offset in relation to the receivers for the planets of the other planetary gear. This reduces space in the axial direction of the drive train and the common planet carrier can be realized in a lighter and more compact manner. In addition, the moments of inertia and the employed masses can be reduced even further in addition to the compact arrangement in the axial direction. The performance capabilities can be increased as a result.

In a highly advantageous embodiment of the drive train in accordance with the invention the number of the planets is the same in the first and second planetary gear. Such an equal number of planets in the first and the second planetary gear allows ideally arranging the planets according to the embodiments as described above in an alternating fashion in the circumferential direction, thus enabling a highly compact configuration.

It is further provided in an advantageous further development of the drive train in accordance with the invention that in at least one of the planetary gears the planets are arranged as stepped planets. In such an especially advantageous embodiment of the planets of a planetary gear in form of step planets, very low diameters of the planetary gear are possible and very high gear ratios can still be realized. This also contributes to an overall volume which is very small with respect to the respectively chosen gear ratio.

It is further provided in a further, highly advantageous embodiment of the configuration in accordance with the invention that the drive train is arranged in such a way that further gears can be provided upstream and/or downstream of the power-split transmission. Such an expansion of the power-split transmission by at least one further gear especially allows the implementation of speeds (e.g. speed-increasing ratios) in order to enable an induction machine to be driven as a generator on the output shaft in a highly efficient way. Furthermore an upstream or downstream transmission may optionally be useful and necessary in order to realize an offset of the axes with respect to each other if this is desirable or necessary by the configuration of the power generation installation for example.

The hydrodynamic component can be arranged as a converter, trilok torque converter, or also as a controllable hydrodynamic coupling. All of them work, wherein the hydrodynamic converter or trilok torque converter offers a special advantage because it is very quick and efficient concerning closed-loop and open-loop controllability of the power which is transmitted by the same.

Further advantageous embodiments of the drive train in accordance with the invention are provided in the present application and will be explained by reference to the embodiment which is described below by reference to FIG. 1 in closer detail.

FIG. 1 shows a schematic view of a possible embodiment of the part of the drive train in accordance with the invention which is situated above the axis of the drive shaft and output shaft.

DETAILED DESCRIPTION

Figure 1:
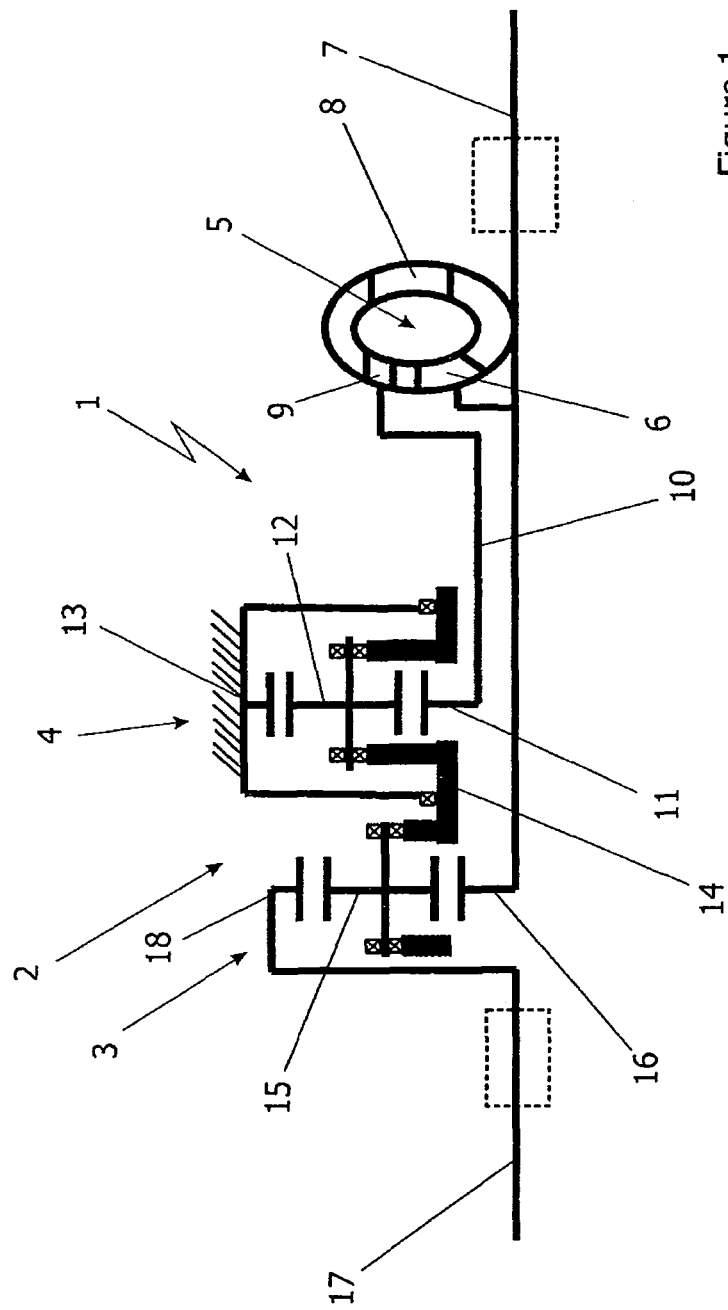
FIG. 1 illustrates a schematic view of a drive train in accordance with one implementation of the present application.

FIG. 1 shows the upper half of a substantially rotational-symmetrical drive train 1. Said upper half shall be understood as a principal illustration and is used for explaining the idea in accordance with the invention. It is a possible embodiment in which upstream and/or downstream gears are omitted. The illustrated drive train 1 substantially comprises a power-split transmission 2 which comprises a first planetary gear 3 as a superposition gear. Furthermore, a second planetary gear 4, which is arranged as an epicyclic gear, is part of the power-split transmission 2 of the drive train 1 in accordance with the invention.

A further relevant component of the drive train 1 in accordance with the invention is a hydrodynamic component 5, which can be arranged for example as a converter, as a trilok torque converter or optionally also as a hydrodynamic variable-speed coupling. In the illustrated embodiment, the hydrodynamic component 5 is arranged as a hydrodynamic converter 5. A pump impeller 6 of the hydrodynamic converter 5 is directly connected to an output shaft 7 of the drive train 1. The power or torque and the speed of the hydrodynamic controller 5 is controllable via a guide wheel 8, and this controlled power will be output again via a turbine wheel 9 and reaches a sun gear 11 of the second planetary gear 4 via a respective hollow shaft 10. Planets 12 are arranged in the second planetary gear 4 which mesh with the sun gear 11 and of which only one is shown here. A ring gear 13 or an outer rim is arranged around the planets 12. It is arranged in a torsion-proof manner in the drive train 1. The planets 12 of the second planetary gear 4 are arranged in this case as so-called pin planets which are respectively mounted in a planet carrier 14. An arrangement as ring planets would also be possible, wherein the planets 12 would be provided with bearings in this case and would rotate on an axis accommodated in the planet carrier 14.

The planet carrier 14 is rotatably mounted in the illustrated embodiment in relation to the fixed ring gear 13 of the second planetary gear 4. The planet carrier 14 is now arranged in such a way that it also carries the planets 15 of the first planetary gear 3 in addition to the planets 12 of the second planetary gear 4. These planets are also arranged in this case as pin planets by way of example and are accommodated in the common planet carrier 14. The planets 15 of the first planetary gear 3 mesh with a sun gear 16 which is directly connected to the output shaft 7 and with the pump impeller 6 of the hydrodynamic converter 5. A drive shaft 17 is connected to a ring gear 18 or the outer rim of the first planetary gear 3.

The first planetary gear 3 is arranged as a superposition gear and the second planetary gear 4 as an epicyclic gear. The planetary gears 3, 4 are coupled to each other via the common planet carrier 14. The drive shaft 17 is driven by a power source with varying speed. This can be a water turbine for example or a wind turbine in particular. This wind turbine rotates according to the applied wind speed at a different speed and supplies a different, continuously varying power to the drive train 1.

This power on the drive shaft 17 reaches the output shaft 7 via the superposition gear 3 and its sun gear 16. The output shaft 7 drives an induction generator directly or with constant intermediate transmission. A portion of the power is returned back to the sun 11 of the second planetary gear 4 via the pump impeller 6 of the hydrodynamic component 5 and its turbine wheel 9. This power is coupled back to the superposition gear 3 via the common planet carrier 14 and superposed on the power originally supplied by the drive shaft 17. As a result of a respective feedback control of the hydrodynamic component 5, e.g. in the converter 5 via the guide wheel 8, the returned power superposed on the original power can be set in such a way that the speed in the region of the output shaft 7 is substantially constant. This process is principally already known from the initially mentioned generic German patent specification.

The advantage in the configuration explained herein is in particular that a higher power can be transmitted by coupling the drive shaft 17 to the ring gear 18 of the first planetary gear 3 than in the coupling of the drive shaft to the planet carrier as illustrated in the generic specification. A further advantage is obtained by using a common planet carrier 14 for coupling the two planetary gears 3, 4, because it can be arranged in a respectively smaller and lighter way and therefore with less mass moment of inertia than a coupling via the ring gears as described in the generic prior art. This applies in particular when the planet carrier 14 is arranged in such a way that the planets 15 of the first planetary gear 3 are arranged offset in the circumferential direction relative to the planets 12 of the second planetary gear 4. This is especially advantageous when the number of the planets in the two planetary gears 3, 4 is the same. The planets can then especially be arranged in an offset manner with respect to each other about the angle of 360° divided by the number of the planets 12, 15 or twice the number of the planets 12, 15 per planetary gear 3, 4. Depending on the arrangement of the planets as pin planets or ring planets, the bearings or the shafts in the planet carrier 14 are arranged offset with respect to each other in the region between the two planetary gears 3, 4, by means of which a wall thickness of the common planetary carrier 14 between the two planetary gears 3, 4 can be realized which corresponds to the wall thickness of the only sole planet carrier. This saves space in the axial direction of the drive train 1 on the one hand and the mass of the common planet carrier 14 can be reduced accordingly on the other hand, thereby reducing its moment of inertia and respectively improving the performance capability and the response behavior of the drive train 1 in the control.

Different constructional variants can be considered in the planetary gears 3, 4, e.g. the use of roller bearings or slide bearings, the use of different gearings, e.g. straight-toothed, helical or herringbone gearwheels, different materials, different numbers of planets 12, 13, wherein the number of the planets 12, 15 should be identical if possible in each of the planetary gears 3, 4.

The drive train 1 in accordance with the invention can be expanded at will by further upstream and/or downstream gear elements or gear steps. In order to realize the highest possible gear ratio and to enable the omission of such additional gear steps if possible, it may also be provided that the planets 12, 15 are used as stepped planets in at least one of the planetary gears 3, 4. For example, the use of stepped planets for the planets 12 allows a comparatively high gear ratio of the second planetary gear 4 which is arranged as an epicyclic gear, which is still provided with a respectively small overall size and can be provided with a light configuration in relation to the achieved gear ratio by using stepped planets 12.

Figure 2:
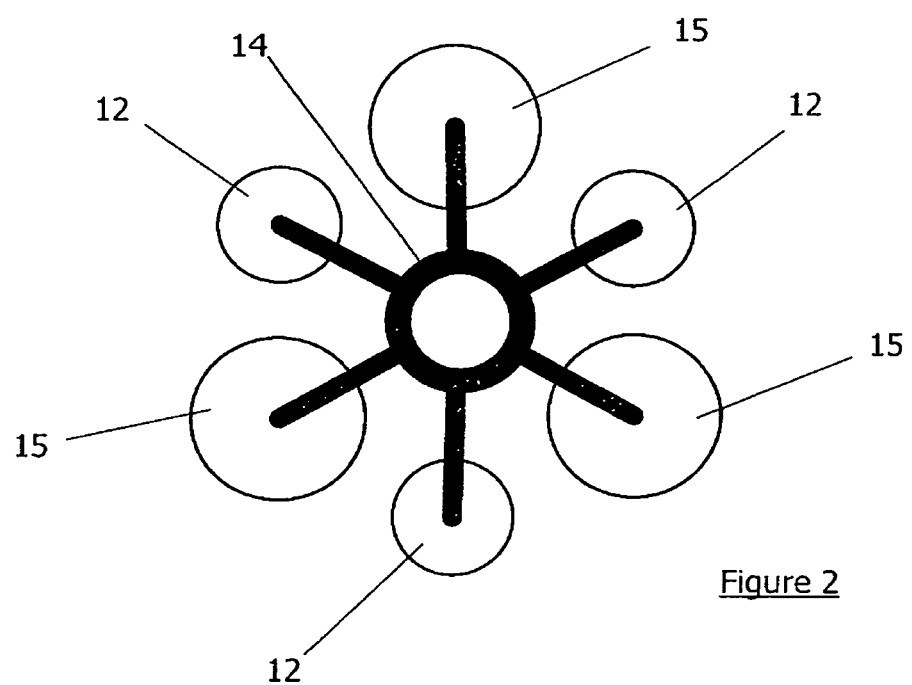
FIG. 2 illustrates a cross section or side view of a planet carrier together with planets of planet gears of FIG. 1.

FIG. 2 shows the planet carrier 14 together with the planets 12 and 15 of the first and second planet gears. FIG. 2 is a cross section or side view of the planet carrier 14 and its planets 12 and 15 of the respective planet gears.

The invention claimed is:

1. A drive train for transmitting a variable power with a variable input speed at a drive shaft and a substantially constant output speed at an output shaft for a power generation installation, driven by a continuous-flow machine, comprising:
   a power-split transmission having a first planetary gear as a superposition gear and a second planetary gear; and
   a hydrodynamic component which takes up power from an output side and returns said power in a controlled manner to the power-split transmission,
   wherein the first and second planetary gears are coupled to each other via a common planet carrier, wherein the drive shaft is coupled to a ring gear of the first planetary gear, and wherein in the common planet carrier, planets of the first planetary gear and planets of the second planetary gear are accommodated in an alternating fashion in a circumferential direction.

2. The drive train according to claim 1, wherein the continuous-flow machine is one of a wind turbine and a water turbine.

3. The drive train according to claim 2, wherein a ring gear of the second planetary gear is arranged in a torsion-proof manner.

4. The drive train according to claim 3, wherein a sun of the second planetary gear is connected to an output component of the hydrodynamic component.

5. The drive train according to claim 3, wherein in the common planet carrier the planets of the first planetary gear and the planets of the second planetary gear are accommodated in an alternating fashion in the circumferential direction.

6. The drive train according to claim 2, wherein a sun of the second planetary gear is connected to an output component of the hydrodynamic component.

7. The drive train according to claim 1, wherein a ring gear of the second planetary gear is arranged in a torsion-proof manner.

8. The drive train according to claim 7, wherein a sun of the second planetary gear is connected to an output component of the hydrodynamic component.

9. The drive train according to claim 1, wherein a sun of the second planetary gear is connected to an output component of the hydrodynamic component.

10. The drive train according to claim 1, wherein the number of the planets is identical in the first planetary gear and in the second planetary gear.

11. The drive train according to claim 10, wherein the planets of the first and second planetary gear are arranged offset with respect to each other in the circumferential direction by a respective angle of 360°, divided by twice the number of the planets of one of the planetary gears.

12. The drive train according to claim 1, wherein further gears are provided upstream and/or downstream of the power-split transmission.

13. A drive train for transmitting a variable power with a variable input speed at a drive shaft and a substantially constant output speed at an output shaft for a power generation installation, driven by a continuous-flow machine, comprising:
   a power-split transmission having a first planetary gear as a superposition gear and a second planetary gear; and
   a hydrodynamic component which takes up power from an output side and returns said power in a controlled manner to the power-split transmission,
   wherein the first and second planetary gears are coupled to each other via a common planet carrier, wherein a ring gear of the second planetary gear is arranged in a torsion-proof manner, and wherein in the common planet carrier, planets of the first planetary gear and planets of the second planetary gear are accommodated in an alternating fashion in the circumferential direction.

14. The drive train according to claim 13, wherein the continuous-flow machine is one of a wind turbine and a water turbine.

15. A drive train for transmitting a variable power with a variable input speed at a drive shaft and a substantially constant output speed at an output shaft for a power generation installation, driven by a continuous-flow machine, comprising:
   a power-split transmission having a first planetary gear as a superposition gear and a second planetary gear; and
   a hydrodynamic component which takes up power from an output side and returns said power in a controlled manner to the power-split transmission,
   wherein the first and second planetary gears are coupled to each other via a common planet carrier, wherein a sun of the second planetary gear is connected to an output component of the hydrodynamic component, and wherein in the common planet carrier, planets of the first planetary gear and planets of the second planetary gear are accommodated in an alternating fashion in the circumferential direction.

16. The drive train according to claim 15, wherein the continuous-flow machine is one of a wind turbine and a water turbine.

* * * * *